United States Patent [19]

Nakamura et al.

[11] 4,427,800

[45] Jan. 24, 1984

[54] PHENOLIC RESIN FOR REFRACTORY USES

[75] Inventors: Masayuki Nakamura; Masaaki Tsuriya, both of Fujieda, Japan

[73] Assignee: Sumitomo Durez Company, Ltd., Japan

[21] Appl. No.: 348,554

[22] Filed: Feb. 12, 1982

[30] Foreign Application Priority Data

Feb. 18, 1981 [JP] Japan ................................. 56-45446

[51] Int. Cl.$^3$ ............................................. B22C 11/22
[52] U.S. Cl. ................................... 523/145; 523/139; 524/876; 524/877; 524/904; 525/501; 528/165; 501/94; 501/108
[58] Field of Search ................ 523/139, 145; 524/876, 524/877, 904; 528/165; 525/501; 501/94, 108

[56] References Cited

U.S. PATENT DOCUMENTS

| | | | |
|---|---|---|---|
| 1,580,424 | 4/1926 | Ellis | 528/165 X |
| 2,617,785 | 11/1942 | Pritchett et al. | 528/165 X |
| 3,993,620 | 11/1976 | Yamanishi et al. | 523/139 |
| 4,058,403 | 11/1977 | Funabiki | 106/56 |
| 4,072,531 | 2/1978 | Funabiki | 106/56 |
| 4,082,718 | 4/1978 | Ando et al. | 260/33.4 R |
| 4,261,878 | 4/1981 | Hirose et al. | 260/38 |
| 4,327,185 | 4/1982 | Bonsall | 501/89 |

*Primary Examiner*—Lucille M. Phynes
*Attorney, Agent, or Firm*—J. F. Tao; J. F. Mudd

[57] ABSTRACT

Refractory shaped articles are prepared by heating refractory mixes comprised of refractory particles and a liquid phenolic resole resin having a methylol group index of about 0.8 or less and a free moisture content of about 8 weight percent or less.

8 Claims, No Drawings

PHENOLIC RESIN FOR REFRACTORY USES

BACKGROUND OF THE INVENTION

This invention relates to a liquid phenolic resole resin (hereinafter called liquid resole) for refractory uses, which is free from odor of formaldehyde during mixing with refractory materials, which has good storage properties in the form of a plastic mud or refractory mix, and which is free from irritating odor during processing of refractory articles which have improved dry strength.

Phenolic resins have been playing a major role in place of conventional coal tar and pitch in organic binders for refractory uses because they can be mixed under ambient temperature with aggregates, they have excellent dry strength, and they can improve the workshop environment during processing of refractories.

For refractory uses, phenolic resins such as novolac and resole resins are employed either jointly or alone in the form of liquid or powder. Some typical examples are powdered novolac resin containing hexamine (hexamethylene tetramine) that are employed with wetting agents such as ethylene glycol, glycerine, or denatured alcohol, or associated with liquid resole type resins.

On the other hand, resole type phenolic resins are employed as a solvent containing liquid resole resin, with a solvent such as ethylene glycol. Water soluble liquid phenolic resins are employed alone. Furthermore these liquid resins associated with powdered novolac type resins are employed.

However, there are drawbacks for each type of resin which must be overcome to meet the needs of certain industries. Novolac type phenolic resins, associated with hexamine and/or solvent such as ethylene glycol, make the work environment disagreeable by emitting a disagreeable odor during the processing of refractory materials. In the case of resole type phenolic resins, both water soluble and solvent containing liquid phenolic resins emit odor of formaldehyde during mixing of refractory materials.

Basic aggregates such as magnesia have recently increased in their demand. However, in the method of manufacturing refractory articles mainly containing such basic aggregates, problems are caused by employing the above-described water soluble or solvent containing liquid resins because the basic aggregates react with methylol groups of the resin structure, free water in said resins and the condensed water emitted in the drying stage of refractory articles. This often leads to the production of refractory articles that are particularly poor in durability, due to cracking during processing.

After much investigation to overcome the drawbacks that conventional novolac or resole type phenolic resins have on the performance of refractory articles, the present inventors have found the solution to the problem. The liquid resole according to the present invention is particularly effective for manufacturing refractory articles consisting of basic aggregates.

SUMMARY OF THE INVENTION

The liquid resole for refractory uses according to the present invention is a phenolic resin prepared from the reaction between phenols and aldehydes, and having a methylol group index of 0.8 or less, preferably 0.1–0.6, and having free water content of 8 weight percent or less, preferably 6 weight percent or less.

When the liquid resole with the above-identified characteristics is employed for manufacturing refractory articles, no emiting formaldehyde odor occurs during mixing of refractory materials or in refractory uses, particularly when the liquid resole is employed for basic aggregate such as magnesia for refractory materials. The liquid resole of the invention causes the plastic mud or refractory mix to have excellent stability. The resulting refractory materials have excellent durability in refractory uses. The effect of the present invention are also obtained by mixing such liquid resoles with novolac type phenolic resins.

DESCRIPTION OF EMBODIMENTS

The methylol group index defined in the present invention is represented by the number of methylol groups for each phenyl linkage in the phenolic resin. On a C13-NMR analytical instrument, the methylol group index is calculated by dividing the integrated value of carbon absorption as peak strength of methylol group shifting at 60–68 ppm by the peak strength connecting to the hydroxyl group of phenols shifting at 145–160 ppm. The free water content in the present invention is represented by the value determined by a Karl-Fischer apparatus for moisture content determination.

It is generally not preferred that the methylol group index be higher than about 0.8 or the free water content be higher than about 8 percent, for plastic mud and refractory articles prepared therefrom. This is because both characteristics and performance degrade as is often seen in employing conventional resins, because of reacting water with basic aggregates during mixing of refractory materials, during storage of mud and during drying refractory articles, respectively.

Thus, the liquid resole of this invention is particularly effective not only in formulating with basic aggregates such as magnesia, but in formulating with acidic aggregates such as silica or clays, as well as neutral aggregates, such as alumina or silicon carbide.

Referring additionally to shapes or forms of refractory articles, the present inventors have found that characteristics and performance are both improved by formulating the liquid resole to a shaped refractory articles of burnt or unburnt refractory brick, and monolithic refractory articles such as ramming-mix, gun-mix, injectable-mix and castable materials.

Phenols for preparing liqud resoles according to the present invention are phenol, cresol, xylenol, ethylphenol, propyl-phenol, butyl-phenol, octyl-phenol, nonyl-phenol, phenyl-phenol, catechol, resorcinol, hydroquinone, and bisphenol A. By-products obtaining during preparing these phenols are also included in the scope of the present invention. In some cases the effectiveness of the present invention can further be accelerated and strengthened in the presence of such by-products.

Aldehydes for preparing the liquid resole according to the present invention are formaldehyde, para-formaldehyde, trioxane, and polyoxymethylene and other sources of methylene groups. Furthermore, catalysts for preparing said liquid resoles, according to the present invention, are oxides, or hydroxides of alkali metals, for instance sodium, potassium, or lithium, those of alkali earth metals, for instance, calcium, magnesium or barium and ammonia or nitrogen containing amines, for instance, triethanolamine, or triethylamine. However, to avoid emitting any irritant odor from refractory articles during their uses, it is preferable to employ alkali metals and alkali earth metals which do not contain nitrogen, or amines which do not form nitrogen containing structure in the resulting phenolic resins.

The refractory materials and liquid resole of the invention are generally used in the proportion of about 1 to 25 parts by weight of liquid resole per 100 parts by weight of refractory material, preferably about 2 to 11 parts by weight of liquid resole per 100 parts by weight of refractory material.

The present invention is further explained with non-limitative Examples as follows wherein "parts" and "percents" indicated in the Examples as well as in the Comparative Examples are based on weight.

EXAMPLES 1

Into a three necked flask equipped with stirrer, reflux condeser and thermometer, 1000 parts of phenol and 750 parts of 37% formalin were charged with 40 parts of 25% sodium hydroxide solution. The mixture was reacted for 40 minutes under reflux. After dehydration under vacuum, a liquid resole was obtained having a methylol group index of 0.56, free moisture content of 4.2%, and viscosity of 28 poise at 25° C. As basic aggregate, 2500 parts of magnesia clinker (70% in coarse particles with a size distribution of 1-3 mm and 30% in fine particles with a distribution of 0.3 mm or less) and 500 parts of flake graphite were added into an experimental mixer, together with 135 parts of the above-described resole resin, and mixed for 30 minutes at ambient temperature to form a plastic mud or refractory mix. Subsequently, the plastic mud was charged into a mold and pressed with a pressure of 1000 kg/cm² to form a molded article of 15×25×100 (mm) in dimension. The article thus obtained was heated from ambient temperature to 170° C. within 15 hours and further run after 3 hours heating at 170° C. as maximum for drying and curing to obtain a specimen of an unburnt refractory article.

EXAMPLE 2

Into a three necked flask according to Example 1, 1000 parts of phenol and 1120 parts of 37% formalin were charged with 80 parts of 25% sodium hydroxide solution. The mixture was reacted for 100 minutes at 90° C. The reaction mixture was neutralized with 50% lactic acid to a pH value of 7.3 and dehydrated under vacuum. A liquid resole was obtained having a methylol group index of 0.42, free moisture content of 3.8, and viscosity of 26 poise at 25° C. A specimen was prepared by the method according to Example 1.

COMPARATIVE EXAMPLE 1

Into three necked flask according to Example 1, 1000 parts of phenol and 1120 parts of 37% formalin were charged with 80 parts of 25% sodium hydroxide solution. The mixture was reacted for 90 minutes at 90° C. The reaction mixture was neutralized with 40% formic acid to a pH value of 7.2 and dehydrated under vacuum. A liquid resole was obtained having a methylol group index of 0.85, free moisture content of 9.2% and viscosity of 31 poise at 25° C. A specimen was prepared by the method according to Example 1.

COMPARATIVE EXAMPLE 2

With the same kind of aggregate according to Example 1, 55 part of ethylene glycol were mixed uniformly, and then 80 parts of a novolac type powdered phenolic resin (number average molecular weight: Mn=560, and 10% in hexamine content to the resin) was added into the mixture. The mixture was further mixed for 30 minutes. A specimen was prepared by the method thereafter according to Example 1.

Table 1 shows the comparison among Example 1, Example 2, Comparative Example 1 and Comparative Example 2, respectively, wtih respect to Ⓐ formaldehyde odor during mixing of raw materials of a refractory use, Ⓑ state of molded mud and Ⓒ an irritant odor emitted from dried refractory article at ignition by flame of gas burner.

TABLE 1

|   |   | Example | | Comparable Example | |
|---|---|---|---|---|---|
|   |   | 1 | 2 | 1 | 2 |
| Ⓐ |   | none | none | strong | none |
|   | Directly after mixing | good | good | failed a little | good |
| Ⓑ | 1 day elapsed | good | good | failed | good |
|   | 4 days elapsed | good | good | failed | good |
|   | 7 days elapsed | good | good | failed | good |
| Ⓒ |   | none | none | none | strong |

Note:
1 good: with good plasticity
2 failed: mix state
3 irritant odor: derived from formaldehyde and amines decomposed by ignition.

As shown in Table 1, Example 1 and Example 2 do not indicate any defect which is seen in Comparable Example 1 and Comparable Example 2.

Table 2 shows the results of apparent density and bending strength obtained by specimen of Example 1, Example 2, Comparative Example 1 and Comparative Example 2, respectively.

TABLE 2

| Time elapsed mixing to molding | Example | | Comparable Example | |
|---|---|---|---|---|
|   | 1 | 2 | 1 | 2 |
| Apparent density |   |   |   |   |
| Direct after mixing | 2.83 | 2.81 | 2.81 | 2.84 |
| 1 day | 2.81 | 2.83 | 2.68 | 2.82 |
| 4 days | 2.81 | 2.80 | 2.64 | 2.82 |
| 7 days | 2.80 | 2.81 | 2.65 | 2.80 |
| Bending strength |   |   |   |   |
| Direct after mixing | 138 | 140 | 121 | 110 |
| 1 day | 140 | 135 | 108 | 115 |
| 4 days | 146 | 137 | 72 | 104 |
| 7 days | 136 | 130 | 68 | 109 |

Note:
Apparent density: according to JIS R 2205
Bending strength: according to JIS R 2213

As shown in Table 2, results obtained by Example 1 and Example 2 are superior to those obtained by Comparative Example 1 and Comparative 2 in bending strength.

The former does not indicate any decrease in bending strength while the latter decreases in this property.

We claim:

1. A phenolic resin for refractory uses, consisting essentially of a liquid phenolic resole resin having a methylol group index of about 0.8 or less.

2. The phenolic resin of claim 1 wherein the liquid phenolic resole resin has a free moisture content of about 8 weight percent or less.

3. A refractory mix consisting essentially of refractory particles and a liquid phenolic resole resin haing a methylol group index of about 0.8 or less.

4. The refractory mix of claim 3 wherein the liquid phenolic resole resin has a free moisture content of about 8 percent or less.

5. A refractory mix consisting essentially of refractory particles and a liquid phenolic resole resin having a methylol group index of 0.1 to 0.6, and a free water content of less than 6 weight percent, in a proportion of about 1 to 25 parts by weight of liquid resole per 100 parts by weight of refractory material.

6. The refractory mix of claim 5 wherein the refractory material comprises magnesia particles.

7. A refractory shaped article prepared by heating the refractory mix of claim 5.

8. A refractory shaped article prepared by heating the refractory mix of claim 6.

* * * * *